US006434636B1

(12) United States Patent
Van Gaasbeck

(10) Patent No.: US 6,434,636 B1
(45) Date of Patent: Aug. 13, 2002

(54) METHOD AND APPARATUS FOR PERFORMING HIGH BANDWIDTH LOW LATENCY PROGRAMMED I/O WRITES BY PASSING TOKENS

(75) Inventor: Richard H. Van Gaasbeck, Mountain View, CA (US)

(73) Assignee: Hewlett-Packard Company, Palo Alto, CA (US)

( * ) Notice: Subject to any disclaimer, the term of this patent is extended or adjusted under 35 U.S.C. 154(b) by 0 days.

(21) Appl. No.: 09/430,795

(22) Filed: Oct. 31, 1999

(51) Int. Cl.[7] .............................................. G06F 13/00
(52) U.S. Cl. .............................. 710/33; 710/5; 710/22; 710/119; 710/305; 711/145
(58) Field of Search ........................ 710/5–7, 22–28, 710/33–35, 107–119, 305–315; 711/145

(56) References Cited

U.S. PATENT DOCUMENTS

| | | | | |
|---|---|---|---|---|
| 5,551,005 A | * | 8/1996 | Sarangdhar et al. | 711/145 |
| 5,588,125 A | * | 12/1996 | Bennett | 710/126 |
| 5,894,587 A | * | 4/1999 | Normoyle et al. | 710/126 |
| 5,941,960 A | * | 8/1999 | Miller et al. | 710/35 |
| 6,012,120 A | * | 1/2000 | Duncan et al. | 710/129 |
| 6,055,598 A | * | 4/2000 | Lange | 710/129 |
| 6,085,274 A | * | 7/2000 | Seeman | 710/129 |
| 6,098,134 A | * | 8/2000 | Michels et al. | 710/108 |
| 6,157,977 A | * | 12/2000 | Sherlock et al. | 710/129 |
| 6,212,589 B1 | * | 4/2001 | Hayek et al. | 710/119 |
| 6,247,086 B1 | * | 6/2001 | Allingham | 710/128 |

* cited by examiner

Primary Examiner—Christopher B. Shin
(74) Attorney, Agent, or Firm—David A. Plettner

(57) ABSTRACT

A method and apparatus performs high bandwidth low latency programmed I/O (PIO) write operations by passing tokens. A computer system in accordance with the present invention includes a plurality of CPUs, with each CPU coupled to a CPU agent. Each CPU agents is coupled to an interconnection fabric, which in turn is coupled to an I/O agent and memory. The computer system may also have multiple I/O agents. Each I/O agent is coupled to an I/O card, and the computer system may have multiple I/O cards. The CPU agents and the I/O agents have token slots, and tokens circulate between the token slots. When a CPU seeks to write to an I/O card, the CPU forwards a PIO write request to the CPU agent. If the CPU agent does not have the token, the CPU agent sends the write data along with a request for the token to the I/O agent. If the token is currently owned by the I/O agent, it is sent to the CPU agent. If the token is owned by another CPU agent, the I/O agent will issue a request to the other CPU agent to recall the token. When the token arrives at the I/O agent, the I/O agent sends the token to the requesting CPU agent and writes the data to the I/O card. At this point, the CPU agent acknowledges the PIO write to the CPU, and the CPU will be able to issue as many back-to-back PIO writes via the CPU agent as buffering, flow control, and device processing speeds will allow. The present invention includes a protocol to control the flow of write data, tokens, requests, and acknowledgments between the CPU agents and the I/O agents. The present invention achieves performance levels comparable to those provided by accelerated PIO write operations, while providing backward compatibility with existing CPUs, operating systems, and drivers.

1 Claim, 2 Drawing Sheets

METHOD AND APPARATUS FOR PERFORMING HIGH BANDWIDTH LOW LATENCY PROGRAMMED I/O WRITES BY PASSING TOKENS

FIELD OF THE INVENTION

The present invention relates to I/O operations in high performance computer systems. More specifically, the present invention relates to ordering I/O transactions by passing tokens between CPU agents and I/O agents in a multiprocessor computer system.

DESCRIPTION OF THE RELATED ART

In a modem high performance computer system having a plurality of CPUs, I/O drivers running on each CPU need to communicate with I/O cards to initiate and complete I/O requests. As is known in the art, it is common for the operating system to use semaphores to allow different processes (whether on the same CPU or different CPUs) to control access to an I/O resource. Once a semaphore has been acquired, a driver typically communicates with the card by performing write operations. These write operations are known in the art as programmed I/O (PIO) writes. Most programming models require that the CPU send a series of PIO writes to the card for each I/O transaction, and the PIO writes must be received by the card in order and without interleaving of PIO writes belonging to a different I/O transaction. PIO writes tend to be slow because the writes must typically travel from the CPU through a high latency interconnection fabric to the I/O card, and then an acknowledgment must be sent from the card back to the CPU through the same high latency interconnection fabric.

At one point in the evolution of computer design, it was common to transfer all data from the CPU to an I/O card using PIO writes. More recently, it has become common for the driver to place data into host memory, and allow the I/O card to retrieve the data using direct memory access (DMA) operations.

Since the I/O card does not know directly when the driver has written data to host memory, the card can either poll host memory periodically via a DMA read, or the driver can perform a PIO write to the I/O card indicating that new data has been placed in host memory. The PIO write is still relatively slow because it must travel through the high latency interconnection fabric, as described above. On the other hand, polling by the I/O card wastes bandwidth if done frequently, and increases latency if done infrequently.

To minimize PIO writes or polling, it is common for the driver to place a number of I/O requests into memory, and either link them together with a linked list or place pointers to the requests in a queue. This allows the I/O card to work on a number of requests before resorting to polling or waiting for a PIO write. Many card-driver programming models even allow the driver to extend the linked list or add to the queue after the card has started working on the requests, thereby further avoiding PIO writes or polling.

Unfortunately, these techniques cannot completely eliminate PIO writes or polling. Consider, for instance, the case where the card is able to service I/O requests faster than they are being supplied by the driver. The card will eventually catch up with the current batch of I/O requests and either need to poll or wait for a PIO write before it can work on subsequent requests. Since some PIO writes are needed even in the best programming models (for example, a PIO write is typically required to notify the card to start polling for DMA operations), the performance of PIO writes is critical to the overall I/O performance of the computer system.

In the discussion above, it was assumed that a PIO write requires that the write travel from the CPU to the I/O card through a high latency interconnection fabric, and that an acknowledgment be sent from the card to the CPU through the same fabric. The I/O space into which such a write occurs is known in the art "non-posted memory mapped I/O space", and such writes will hereinafter be referred to as "non-posted PIO writes". Note that non-posted PIO writes from multiple CPUs will remain ordered, since a write from one CPU will not be performed until a prior write from another CPU has been acknowledged. In essence, the ordering point of I/O transactions using non-posted PIO writes is the I/O card. Unfortunately, many CPU cycles are wasted waiting for each non-posted PIO write to complete, which results in a high cycle-per-instruction count and a slow non-posted PIO write completion rate.

The latency incurred by non-posted PIO writes is reduced somewhat in modem computer systems by moving the ordering point to a position in the high latency interconnection fabric that is closer to the CPUs. Consider that in a simple modem computer system, the high latency interconnection fabric is typically provided by a chipset. The chipset typically includes a CPU agent that is coupled to each CPU, and an I/O agent that is coupled to the I/O card. The I/O agent is typically coupled to the I/O card using a relatively low speed I/O bus, such as a PCI bus. PCI busses typically operate at speeds of 33–66 MHz. On the other hand, the bus between the I/O agent and the CPU agent (often referred to as a "front side bus") is relatively fast. Front side busses typically operate at speeds greater than 100 MHz. The link between the I/O bus and the front side bus is known in the art as a bridge. For example, in a computer system having PCI card slots, a PCI bridge links the PCI bus to the front side bus. Typically the I/O agent is located at the bridge.

When the CPU issues a PIO write to the I/O agent, the writes are directed to a memory area known in the art as "posted memory mapped I/O space". Such writes will hereinafter be referred to as "posted PIO writes". Posted PIO writes also maintain ordering between multiple CPUs. However, in a posted PIO write the I/O agent generates the acknowledgment. Since this transaction occurs exclusively on the higher speed front side bus, the latency of the transaction is reduced. The I/O agent then communicates with the I/O card through the I/O bus, and guarantees that the ordering of the writes between the CPUs and the I/O agent is maintained.

In more complex modem computer systems, the I/O agent may be coupled to the CPU agent by a more complex high latency fabric, such as a crossbar or a ring. In such systems, posted I/O writes provide less of an advantage because the write must still traverse the high latency fabric.

While not nearly as common in the art as non-posted and posted I/O space, "accelerated I/O space" reduces latency further by moving the ordering point to the CPU agent. Writes to accelerated I/O space will hereinafter be referred to as "accelerated PIO writes". In an accelerated PIO write, the CPU issues a write and the write is immediately acknowledged by the CPU agent, resulting in a PIO write operation having a very low latency because the acknowledgment does not need to travel on the front side bus or a higher latency fabric. The problem with accelerated PIO writes is that the ordering point can only be located at one CPU agent at one time. Typically, it is the responsibility of drivers and operating system software to monitor whether accelerated PIO writes have at least gotten to the I/O agent before switching the ordering point from one CPU agent to another. This is typically done by issuing PIO reads and writes to status registers in the I/O agent. Note that unnecessary PIO reads and writes may occur if one CPU releases and reacquires the ordering point without the ordering point being switched to another CPU. Since the drivers and operating system software must be "aware" of accelerated I/O space to allow the ordering point to be switched between CPU agents, and implementations of accelerated I/O space can vary, this technique has not been widely used and is difficult to support using "shrink-wrapped off-the-shelf" operating systems, such as the Windows NT® operating system provided by Microsoft Corporation.

In contrast, both posted and non-posted PIO writes provide a single ordering point at which PIO writes from multiple CPUs can be ordered. Accordingly, the drivers and operating system do not need to switch the ordering point. As a matter of fact, the drivers and software do not even need to be aware of whether a PIO write is being serviced by the computer system as a posted or non-posted PIO write. What is needed in the art is a way of performing PIO writes that achieves performance levels comparable to the performance levels achieved by accelerated I/O space, yet maintains the simpler, widely known, and more generic programming models associated with posted and non-posted I/O space.

SUMMARY OF THE INVENTION

The present invention is a method and apparatus for performing high bandwidth low latency programmed I/O (PIO) write operations by passing tokens. In essence, the present invention allows the ordering point for PIO writes to circulate between multiple CPU agents and an I/O agents, while maintaining compatibility with the simpler, widely known, and more generic programming models associated with posted and non-posted I/O space.

A computer system in accordance with the present invention includes a plurality of CPUs, with each CPU coupled to a CPU agent. The computer system may also include additional I/O agents. Each CPU agent is coupled to a high latency interconnection fabric, which in turn is coupled to an I/O agent and memory. Each I/O agent is coupled to an I/O card. The CPU agents and the I/O agents each have token slots, and token circulate between the token slots.

The home of each token is in an I/O agent. When a CPU seeks to write to an I/O card via its CPU agent, the CPU forwards a PIO write request to the CPU agent. If the CPU agent does not have the token corresponding to the write request, the CPU agent sends the write data along with a request for the token to the I/O agent. The CPU agent then waits for a response from the I/O agent before acknowledging the PIO write to the CPU, thereby preventing the CPU from issuing any more PIO writes until the token is received by CPU agent.

If the token is currently owned by the I/O agent, it is sent to the CPU agent. However, if the token is owned by another CPU agent, the I/O agent will issue a request to the other CPU agent to recall the token. The recall of token will not bypass any outstanding I/O write operations from the other CPU agent, thereby allowing the outstanding I/O operations from the other CPU agent to be received by the I/O agent first.

When the token arrives at the I/O agent, the I/O agent sends the token to the requesting CPU agent and writes the data to the I/O card. At this point, the CPU agent acknowledges the write to the CPU, and the CPU will be able to issue as many back-to-back PIO writes via the CPU agent as buffering, flow control, and device processing speeds will allow. The present invention includes a protocol to control the flow of write data, tokens, requests, and acknowledgments between the CPU agents and the I/O agent.

By using tokens to shift the ordering points of PIO write transactions between CPU agents and the I/O agents, the present invention achieves performance levels comparable to those provided by accelerated PIO write operations. However, since the token passing transactions provided by the present invention are confined to the CPU agents and the I/O agents, the CPUs, drivers, and operating system did not need to be altered to benefit from the present invention. Accordingly, the present invention provides backward compatibility with existing CPUs, operating systems, and drivers.

DETAILED DESCRIPTION OF THE PREFERRED EMBODIMENTS

Figure 1:
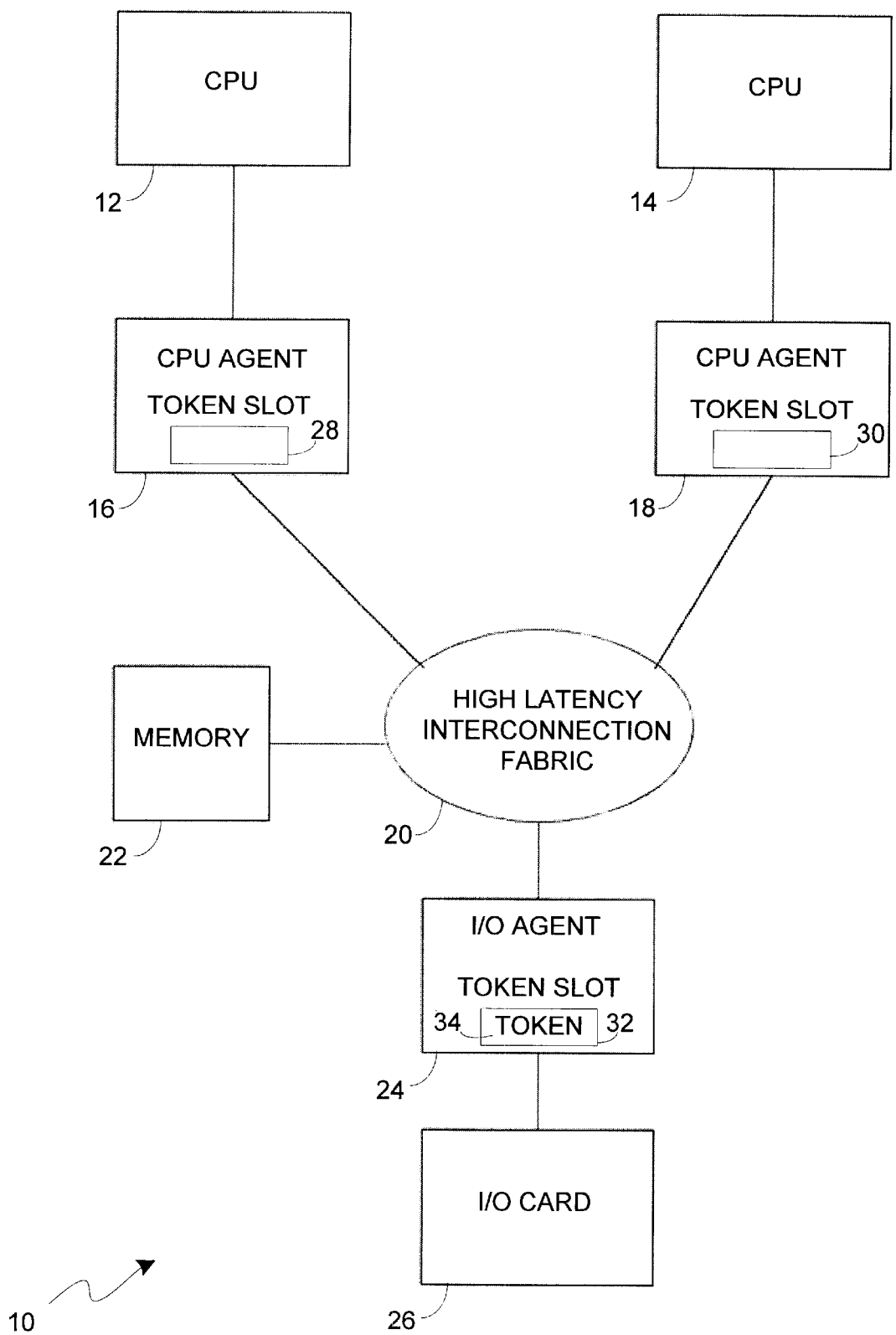
FIG. 1 illustrates a computer system which includes a token passing mechanism that facilitates fast ordered programed I/O write operations, in accordance with the present invention.

The present invention is a method and apparatus for performing high bandwidth low latency programmed I/O (PIO) writes by passing tokens. In essence, the present invention allows the ordering point for PIO writes to circulate between multiple CPU agents and I/O agents, while maintaining compatibility with the simpler, widely known, and more generic programming models associated with posted and non-posted I/O space. FIG. 1 illustrates a computer system 10 that includes the method and apparatus of the present invention.

Computer system 10 includes CPUs 12 and 14. Each CPU is coupled to a CPU agent. Accordingly, CPU 12 is coupled to CPU agent 16 and CPU 14 is coupled to CPU agent 18. Both CPU agents are coupled to high latency interconnection fabric 20. Memory 22 and I/O agent 24 are also coupled to fabric 20. Finally, I/O agent 24 is coupled to I/O card 26. Note that computer system 10 is relatively simple. In other embodiments, additional CPUs, CPU agents, I/O agents, and I/O cards may be coupled by a high latency fabric such as a crossbar or a ring.

CPU agents 16 and 18 include token slots 28 and 30, respectively, and I/O agent 24 includes token slot 32. In addition, a token 34 is contained in token slot 32. Token 34 circulates between token slots 28, 30, and 32, with token slot 32 being the home location of token 34, as described below.

In a typical simple embodiment of the present invention, high latency interconnection fabric 20 will include a front side bus. Furthermore, an a simple embodiment an I/O bus, such as a PCI bus, will couple I/O agent 24 to I/O card 26, and I/O agent 24 will typically be located in a bridge that links the front side bus to the I/O bus. In a more complex embodiment, a series of clusters of CPUs may be coupled together via a high latency fabric such as a ring or crossbar, with each cluster containing the components shown in FIG. 1 and the components within each cluster linked by front side and PCI busses.

In accordance with the present invention, the token is passed between CPU agents 16 and 18 and I/O agent 24 to implement low latency PIO writes. The term "fast ordered PIO writes" will be used herein to refer to PIO writes performed in accordance with the present invention.

The number of tokens required in a computer system that includes the present invention is implementation dependent. However, in general the number of tokens required will match the number of I/O devices in the computer system. For economy, it is possible that two or more devices can be controlled by the same token, however doing so may result in a reduction of performance. Also note that some I/O devices (such as a multi-channel SCSI device) may include multiple channels. Such device will have a register set, and a token is required for each register set.

In FIG. 1, the home of token 34 is slot 32 of I/O agent 24. Assume that CPU 12 seeks to write to I/O card 26 via I/O agent 24, CPU 12 forwards the write request to CPU agent 16. If CPU agent 16 does not have token 34, CPU agent 16 sends the write data along with a request for token 34 to I/O agent 24. CPU agent 16 then waits for a response from I/O agent 24 before acknowledging the write to CPU 12, thereby preventing CPU 12 from issuing any more PIO writes until token 34 is received by CPU agent 16 from I/O agent 24.

If token 34 is currently in slot 32 of I/O agent 24, I/O agent 24 gives the token to CPU agent 16. At this point, CPU 12 will be able to issue as many back-to-back PIO writes via CPU agent 16 as buffering, flow control, and device processing speeds will allow.

Assume that CPU agent 16 has token 34 in slot 28, and CPU 12 has issued a series of back-to-back fast ordered PIO writes. Now assume that CPU 12 and CPU agent 16 issue a final fast ordered PIO write for a certain I/O transaction, and CPU 12 releases a semaphore in memory that indicates that I/O card 26 is available. CPU agent 16 still has token 34 in slot 28. Next, CPU 14 acquires the semaphore and starts issuing PIO writes to I/O card 26 via CPU agent 18 and I/O agent 24. The first PIO write transmitted from CPU agent 18 to I/O agent 24 will include a request to obtain token 34. Since I/O agent 24 does not have token 34, I/O agent 24 will issue a request to CPU agent 16 agent to recall token 34. The recall of token 34 will not bypass any outstanding I/O write operations between CPU agent 16 and I/O agent 24, thereby allowing the outstanding I/O operations from CPU 12 to be received by I/O agent 24 first.

When token 34 arrives at I/O agent 24, I/O agent 24 sends token 34 to CPU agent 18, which holds token 34 in slot 30. At this point, CPU agent 18 acknowledges the write to CPU 14, and CPU 14 can issue subsequent fast ordered PIO writes back-to-back without delay.

While a simple embodiment of a computer system has been shown in FIG. 1 to facilitate an understanding of the present invention, this embodiment tends to obscure the problem that the present invention solves. More specifically, assume that a computer system in accordance with the present invention comprises a series of multiprocessor clusters, with the clusters coupled together by a high latency fabric such as a crossbar or a ring. Further assume that the semaphore is in a memory location within the cluster, but the I/O agent and card are in a different cluster. In such a computer system, the semaphore may be released well before the last PIO write is acknowledged.

The present invention assumes that high latency interconnection fabric 20 provides in-order delivery between any two points, but not necessarily total ordering between all endpoints. Fabric 20 may reorder transactions internally, use multiple path, and implement retries, as long as fabric 20 reliably delivers packets in order to the endpoints.

To service fast ordered PIO writes, the present invention includes a protocol that controls the flow of write data, tokens, requests, and acknowledgments between the CPU agents and the I/O agents. This protocol is set forth below:

PIOW-Acquire-Token. This transaction flows from the CPU agent to the I/O agent to perform a fast ordered PIO write. The CPU agent either has the token from a previous Write-Acknowledge-With-Token (see below) or is requesting ownership of the token. The data to be written is included in the transaction.

PIOW-Recall-Token. This transactions flows from the I/O agent to the CPU agent currently holding the token. The transaction requests that the CPU agent issue a PIOW-Token-Writeback transaction (see below) as soon as possible to return the token to its home location in the I/O agent.

PIOW-Token-Writeback. This transactions flows from the CPU agent currently holding the token to the I/O agent. The transaction transfers ownership of the token back to the I/O agent.

PIOW-Acknowledge-With-Token. This transaction flows from the I/O agent to the CPU agent. It informs the CPU agent that the CPU agent now owns the token and may issue subsequent back-to-back fast ordered PIO writes.

PIOW-Return-Token. This is an optional transaction. It is used to return the token from the CPU agent to the I/O agent without performing a fast ordered PIO write. A computer system implementing this transaction could use the transaction to release the token after a period of time expires, or to return the token to its home location in the I/O agent before deallocating a CPU.

PIOW-Don't-Acquire-Token. This is an optional transaction that would be implemented in a computer system that also supports accelerated I/O space. This transaction flows from the CPU agent to the I/O agent to perform an accelerated PIO write, and recalls the token to the I/O agent if the I/O agent does not already have the token. If a particular computer system implements both accelerated PIO writes and fast ordered PIO writes, then arrival of this transaction at the I/O agent will ensure that all previous PIO writes regulated by the token have arrived at the I/O agent by recalling the token from the CPU agent to the I/O agent. By issuing this transaction, the CPU agent releases the token if it is holding the token. After the transaction completes, the owner of the token becomes (or remains) the I/O agent.

PIOW-Acknowledge-Without-Token. This is also an optional transaction that would be implemented in a computer system that also supports accelerated I/O space. This transaction flows from the I/O agent to the CPU agent. The transaction informs the CPU agent that the CPU agent does not own the token, but that the previous write has been accepted by the I/O agent. This transaction is issued by the I/O agent in response to a PIO-Don't-Acquire-Token.

Figure 2:
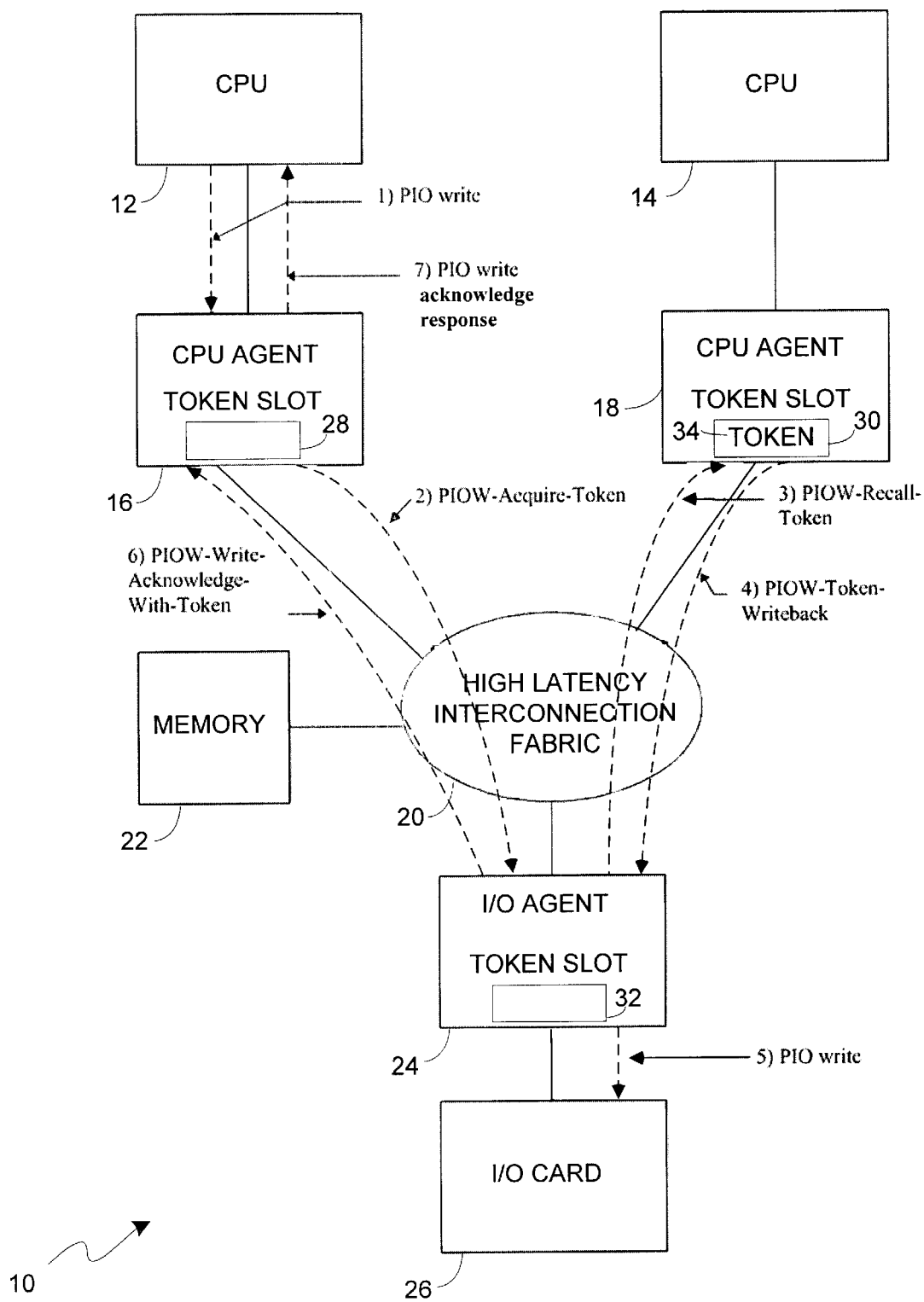
FIG. 2 illustrates the computer system of FIG. 1, and has been annotated to show how a protocol defined in accordance with the present invention is used to perform a fast ordered PIO write operation.

FIG. 2 shows the same computer system 10 of FIG. 1, and has been annotated to illustrate how the protocol defined above in accordance with the present invention is used to perform a fast ordered PIO write. In the example that follows, assume that initially CPU agent 18 has token 34 stored in slot 30 (as shown in FIG. 2) because CPU 14 has previously issued fast ordered PIO writes. Further assume that CPU 14 has just released a semaphore and CPU 12 has acquired the semaphore and is about to start issuing fast ordered PIO writes. As discussed above, CPU 12 may acquire the semaphore before the last PIO write of CPU 14 is completed.

In step 1, CPU 12 issues a PIO write transaction to CPU agent 16. In step 2, CPU agent 16 sends a PIOW-Acquire-Token transaction to I/O agent 24, along with the PIO write data. Since I/O agent 24 does not have token 34, in step 3 I/O agent 24 sends a PIOW-Recall-Token transaction to CPU agent 18 because CPU agent 18 has token 34 in slot 30, as is shown in FIG. 2.

In step 4, CPU agent 18 responds by returning token 34 by sending a PIOW-Token-Writeback transaction to I/O agent 24. In step 5, I/O agent 24 has token 34, and therefore I/O agent 24 knows that it has received all outstanding PIO writes from CPU 14. Accordingly, I/O agent 24 is now able to forward the PIO write to I/O card 26.

In step 6, I/O agent 24 sends token 34 to CPU agent 16 via a PIOW-Acknowledge-With-Token transaction, and CPU agent 16 stores token 34 in slot 28. Finally, in step 7 CPU agent 16 responds to the PIO write initiated by CPU 12 in step 1 with a PIO write acknowledge response, thereby allowing CPU 12 to initiate the next PIO write. As long as CPU agent 16 has token 34, CPU agent 16 can receive PIO writes from CPU 12 and immediately acknowledge the PIO writes to CPU 12. Furthermore, CPU agent 16 can send back-to-back PIO writes to I/O agent 24 without waiting for acknowledgments from I/O agent 24.

To simplify the example above, a tight ordering mechanism between the CPU and the CPU agent was used. However, nothing in the present invention prevents a looser ordering mechanism. For example, if CPU agent 16 includes an input pipeline and can receive several requests from CPU 12 before acknowledging the requests back to CPU 12, this is still possible under the present invention. However, the first request will not be acknowledged until the token is received by CPU agent 16. Accordingly, while CPU agent 16 is waiting for the token, CPU 12 can continue until it must have an acknowledgment.

One of the advantages of the present invention is that the protocol required to implement fast ordered PIO writes exists solely within the CPU agents, the I/O agents, and the interconnection fabric. Typically, these components are provided within chipsets and higher latency fabrics, such as rings and crossbars. The CPUs, drivers, operating system, and application programs do not need to know that the PIO writes are being serviced as fast ordered PIO writes. From the point of view of the CPU, the PIO writes look just like non-posted or posted PIO writes, except that the execution speed of the second (and subsequent) PIO writes is much faster. Accordingly, the present invention is able to provide the performance benefits associated with accelerated I/O space, while maintaining backward compatibility with existing operating systems and drivers. Note that in an alternative embodiment, the functions of the CPU and the CPU agent could be combined into a single IC, and the CPU could participate directly in the protocol set forth above.

The performance improvements provided by the present invention are dramatic. Based on latencies found in current computer systems, fast ordered PIO writes are expected to complete about 02.5 to 3 times faster than posted PIO writes, resulting in overall system benchmark improvements of about 5% to 10%. Although the present invention has been described with reference to preferred embodiments, workers skilled in the art will recognize that changes may be made in form and detail without departing from the spirit and scope of the invention.

What is claimed is:

1. A method of performing a programed I/O (PIO) write comprising:

issuing a PIO write request from a first CPU to a first CPU agent;

issuing a PIO write and acquire token request from the first CPU agent to an I/O agent via an interconnection fabric;

issuing a PIO recall token request from the I/O agent to a second CPU agent via the interconnection fabric;

issuing a PIO token writeback response from the second CPU agent to the I/O agent via the interconnection fabric, wherein the PIO token writeback response includes a token;

directing the PIO write request from the I/O agent to an I/O card;

issuing a PIO write acknowledge with token response from the I/O agent to the first CPU agent, wherein the PIO write acknowledge with token response includes the token; and issuing a PIO write acknowledge response from the first CPU agent to the first CPU.

* * * * *